United States Patent [19]

Braun et al.

[11] 4,303,276
[45] Dec. 1, 1981

[54] CONVEYOR CHUTE FOR CHAIN SCRAPER CONVEYORS

[75] Inventors: Gert Braun; Ernst Braun, both of Essen-Heisingen, Fed. Rep. of Germany

[73] Assignee: Halbach & Braun, Fed. Rep. of Germany

[21] Appl. No.: 116,234

[22] Filed: Jan. 28, 1980

[30] Foreign Application Priority Data

Feb. 7, 1979 [DE] Fed. Rep. of Germany ....... 2904525

[51] Int. Cl.³ .............................................. E21C 35/12
[52] U.S. Cl. ........................................ 299/43; 238/219
[58] Field of Search .................... 299/34, 43; 238/151, 238/218, 219

[56] References Cited

U.S. PATENT DOCUMENTS 3,897,108  7/1975  Krohm et al. .................. 299/43 X
4,205,882  6/1980  Hauschopp et al. .................. 299/43

FOREIGN PATENT DOCUMENTS 1461961  11/1966  France .................................. 299/43
1145247  3/1969  United Kingdom .................. 299/34

Primary Examiner—Ernest R. Purser
Attorney, Agent, or Firm—McGlew and Tuttle

[57] ABSTRACT

A conveyor chute for chain scraper conveyors, comprises, a plurality of chute sections joined together with a clearance therebetween for free motion. Each of the sections includes a guide plank having a reinforcing plate portion adjacent a respective end thereof and a pin extending outwardly from the reinforcing section. A common connecting plate interconnects the separate sections and it has spaced apart eye openings therethrough into which a respective pin segment extends. The plates have a web between adjacent pins of adjacent sections and the eye openings and the segments are spaced to provide the clearance therebetween. Each guide plank comprises an auger thread plank for coal which is made of a box-like section construction. Each box-like section has an exterior wall covering the pin segments and an inner wall spaced from the exterior wall forming a locking pocket therewith, which receives the locking or connecting plate. The locking or connecting plate has an exterior surface which is flush with the exterior surface of the exterior wall and forms a tread bridge between adjacent sections.

6 Claims, 3 Drawing Figures

CONVEYOR CHUTE FOR CHAIN SCRAPER CONVEYORS

FIELD AND BACKGROUND OF THE INVENTION

This invention relates to the construction of conveyors in general and, in particular, to a new and useful conveyor chute for a chain scraper conveyor.

The invention relates more particularly to a conveyor chute for chain scraper conveyors, comprising, chute sections joined to each other with clearance for free motion and guide planks for the material conveyed, with the chute sections having chute-connecting elements and the guide planks having pin segments on their inside in the area of the plank ends. Each two adjacent pin segments of guide planks to be joined to each other are assigned one common connecting plate, which has eyes separated from each other by a web for the accommodation of the two pin elements which are encircled by the connecting plate and which provide seating of the web between them with specified clearance for free motion on the other.

A guide plank of this type is known, in which the pin segments are designed as semi-cylinders and the plate eyes as semi-ovals, and in which the contact surfaces facing away from the web between the pin segments and the plate eyes are designed as cylindrical contact areas. Furthermore, the web is of a width to suit the clearance for free motion between the adjacent guide planks.

This guide plank has been successful per se, particularly because the guide plank connection alone is able to absorb the tensile, compressive and shear stresses in the course of the forward motion of the conveyor chute, thereby, reducing substantially the stresses attacking the chute connecting elements while still providing the clearance required between the chute sections and guide planks, respectively. However, the guide planks of this known embodiment can be regularly attached to the chute sections only after the latter have been assembled. This is unsatisfactory inasmuch as the chute sections and the guide planks must be transported separately to the underground site, for instance, and it is only there that the conveyor chute can be assembled.

SUMMARY OF THE INVENTION

The present invention provides a conveyor chute with a chute section which is equipped with the guide planks located above ground which are designed to guide a mining machine.

The guide planks of the invention are designed as tread planks for a coal auger which, for this purpose, consist of a box section with an upper tread for the auger. The outside wall of the box section covers, with specified spacing the pin segments on the inside wall in the area of the plank ends, each forming one tread-free locking pocket between the plank ends of adjacent tread planks. The connecting plate encircling the pin segments is lockable by means of locking plates which are insertable, with specified mutual clearance for free motion, into the locking pocket, and is flush with the connecting plate surface and the tread surface, thus forming a tread bridge in the abutting area of adjacent tread planks.

Since the guide planks are designed as tread planks, the conveyor chute, according to the invention, is also suited for use with mining machines other than augers, if mining machines are involved which require a tread on the forehead side. Irrespective thereof, preassembly of the tread planks to the conveyor chute sections above ground is now possible because, due to the design of the tread plank ends, the connecting plates can be assembled later and locked by means of the locking plates. Consequently, the separate transport of chute sections and guide or tread planks to the underground site is no longer necessary.

Other characteristics essential to the invention are described in the following. For example, the treads of the guide planks can cover the associated chute wall section, thereby achieving particularly wide tread surfaces which are advantageous from the aspect of pressure per unit of area.

According to the invention, reinforcing plates are welded into the end of each tread plank with the pin segments and also into plates to hang the locking plates. Thus, the ends of the tread planks, which are designed as box sections, are utilized in a unique manner for the absorption of the acting stresses, taking into consideration the connecting plate and locking plates to be attached. The invention further provides for the facing sides of the locking plates to taper downwardly, and for their opposite sides to each have a projecting hook, so as to be suspendable by the projecting hook from a recess in the hanger plates so that their rear support surface rests against the hanger plates.

This affords a perfect fixation of the locking plates in the locking pocket while additionally making it possible to remove the locking plates from the locking pocket relatively simply in the course of disassembly, due to the tapers. This is also contributed to by the measure that the locking plates preferably have an ejection recess above the hanger hooks into which an ejection tool can be inserted. In addition, the locking plates may be secured in the locking pocket by means of lock bolts, such as locking pins.

In essence, the advantages achieved by the invention are that a conveyor chute is created having guide planks which are designed as tread planks for coal augers or other mining machines and which, beyond this, make their preassembly to the associated chute sections possible because, in the course of final assembly, a safe connection of the tread plank ends can now be easily established by means of connecting plates and locking plates. The connecting plates and locking plates are also designed so that a tread surface addendum originates in the butting areas between the tread planks.

Accordingly, an object of the present invention is to provide a chain scraper conveyor chute which is made up of a plurality of sections which are interconnected, with each section comprising a box-like construction, with an inner wall spaced inwardly from an outer wall and forming a pocket therebetween which receives a locking plate, the outer wall carrying a reinforcing section having segments which fit into respective, spaced apart eyelet openings, the spacing between the plate openings and the pin segments being such that the individual sections have a clearance of motion therebetween.

A further object of the invention is to provide a conveyor chute for chain scraper conveyors which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

DESCRIPTION OF THE PREFERRED EMBODIMENT

Figure 1:
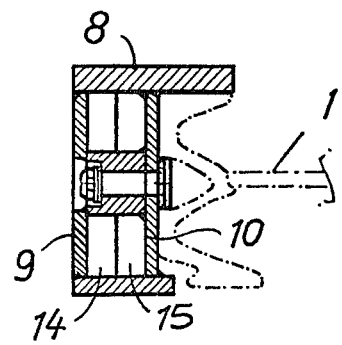
FIG. 1 is a partial vertical sectional view of a conveyor chute constructed in accordance with the invention.
Figure 2:
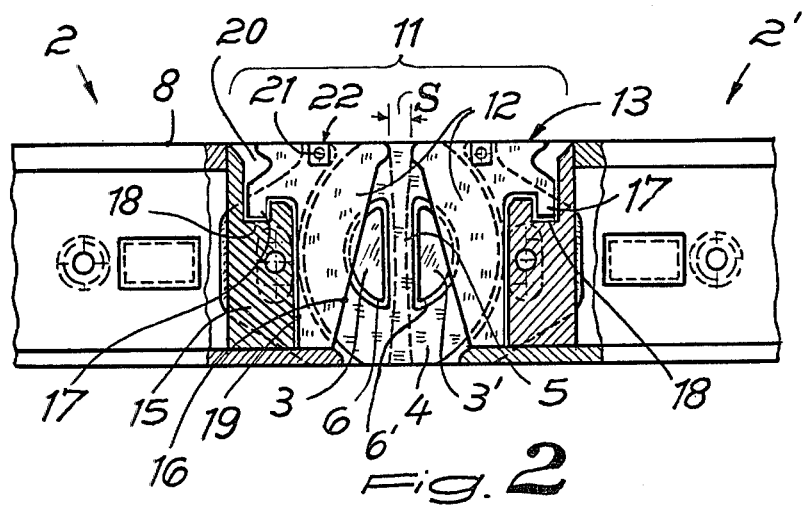
FIG. 2 is a schematic front sectional view, partly in elevation, of the chain conveyor chute of FIG. 1 showing the interconnection of two plank ends.
Figure 3:
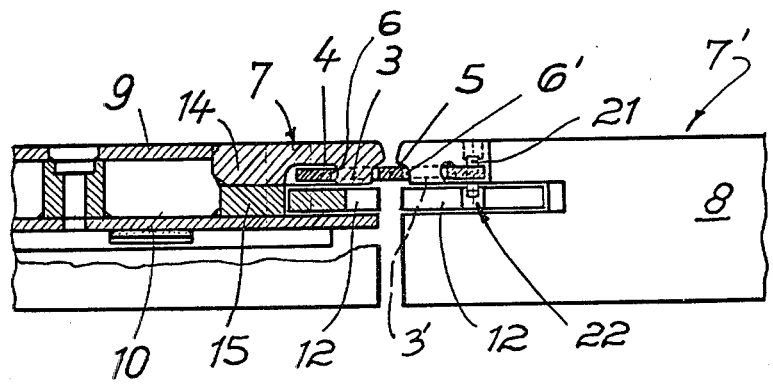
FIG. 3 is a top plan view of the interconnected plank end sections shown in FIG. 2.

Referring to the drawing in particular, the invention embodied therein, comprises a conveyor chute for chain scraper conveyors. As seen in the drawings, there is a conveyor chute 1 for chain scraper conveyors, consisting of chute sections 2 and 2' joined to each other with clearance for free motion, with guide planks for the material conveyed. The chute sections 2, 2' have chute connecting elements, and the guide planks have pin segments 3, 3' on their inside in the area of the plank ends, with each two adjacent pin segments 3 of the guide planks to be joined to each other being assigned one common connecting plate 4 which has eyes 6, 6' separated from each other by a web 5, for the accommodation of the two pin segments 3, 3' which are encircled by the connecting plate 4.

The web 5 is seated between the pin segments 3 and 3' with specified clearance for free motion. The guide planks are designed as tread planks 7 for a coal augur or a similar mining machine and, for this purpose, form a box section with an upper tread surface 8 for the augur. The outside wall 9 of the box section covers, with specified spacing, the pin segments 3 on the inside wall 10 in the area of the plank ends, forming a tread-free locking pocket 11 between the plank ends of adjacent tread planks 7. In each abutting area, the connecting plate 4 encircling the pin segments 3 is lockable by means of locking plates 12 which are insertable, with specified clearances for free motion relative to each other, into the locking pocket 11 and are flush with the surface of the connecting plate 4 and of the treads 8, thus forming a tread bridge 13 in the abutting area of the adjacent tread planks 7.

The treads 8 of the tread planks 7 cover the associated chute wall section. Reinforcing plates 14 with the pin elements 3 are welded into the end of each tread plank 7 and suspension plates 15 for the locking plates 12 are welded into the end of each tread plank 7.

The mutually facing sides of the locking plates 12 each have a downwardly oriented taper 16 for the deposit of fine coal and other contaminations, and on each of their opposite sides, they have a projecting hook 17.

The locking plates 12 can be hung into a hanger recess 18 of the suspension plates 15 by means of the projecting hook 17. Of course, the thickness of the locking plates 12 is chosen so that the connecting plate 4 can no longer be pulled off its pin segments 3 when the locking plates 12 are inserted in the locking pocket 11. Moreover, the locking plates 12 have an ejection recess 20 for the engagement of a tool above the hooks 17. The locking plates 12 may additionally be secured in the locking pocket 11 by means of lock bolts 21, e.g., locking pins. For this purpose, appropriate holes 22 or recesses will be provided in the reinforcing plates 14 and in the locking plates 12.

While a specific embodiment of the invention has been shown and described in detail to illustrate the application of the principles of the invention, it will be understood that the invention may be embodied otherwise without departing from such principles.

What is claimed is:

1. A conveyor chute for chain scraper conveyors, comprising, a plurality of chute sections joined together with a clearance therebetween for free motion of one section in respect to the other, each section including a guide plank having a reinforcing plate portion adjacent an end thereof with an outstanding pin segment, a connecting plate interconnecting said segments having spaced apart eye openings therethrough into which a respective pin segment extends and with a web portion disposed between said pin segments, said eye openings and said pin segments being spaced apart by an amount to provide a clearance of motion between said sections, each of said sections comprising an auger tread plank of a box section configuration having an exterior wall covering said pin segments, an interior wall spaced from said exterior wall and said pin segments, said interior wall forming with said exterior wall a locking pocket adjacent the respective plank ends into which said connecting plate is located, said connecting plate having an exterior surface flush with the exterior surface of said exterior wall to form a tread bridge between adjacent sections.

2. A conveyor chute for chain scraper conveyors, ss claimed in claim 1, wherein said exterior wall covers the associated locking pocket.

3. A conveyor chute for chain scraper conveyors, as claimed in claim 1, wherein said exterior wall has a reinforcing plate welded to the exterior thereof and forming said reinforcing plate portion, and a suspension plate disposed over said inner wall between said inner wall and said reinforcing portion.

4. A conveyor chute for chain scraper conveyors, as claimed in claim 3, wherein said connecting plate includes a side portion on each side forming a projecting hook, each section suspension plate having a recess therein into which a respective hook is engaged, said connecting plate also having a rear support surface resting on said suspension plate.

5. A conveyor chute for chain scraper conveyors, as claimed in claim 1, wherein said connecting plate includes an end portion on each side with a hook formation with an ejection recess defined above said hook formation, said pocket being bounded on respective sides of said connecting plate by a member having a recess into which said hook portion extends.

6. A conveyor chute for chain scraper conveyors, as claimed in claim 5, including a locking bolt bolting said connecting plate to said respective end sections.

* * * * *